Oct. 9, 1962      A. BEAULIEU      3,057,111

ANIMAL TRAP

Filed June 9, 1961

INVENTOR
Arthur BEAULIEU

BY: Pierre Lesperance

AGENT

United States Patent Office 3,057,111
Patented Oct. 9, 1962

3,057,111
ANIMAL TRAP
Arthur Beaulieu, 1215 St. Paul St., Shawinigan, Quebec, Canada
Filed June 9, 1961, Ser. No. 115,950
3 Claims. (Cl. 43—81)

The present invention relates to a trap for animals, and especially for game and has for its general object the provision of such a trap which can be made in different sizes in order to trap big, medium and small game, such as bear, beaver, and muskrat.

A more specific object of the present invention relates to an animal trap of the character described which is of simple, relatively inexpensive construction, and which is very efficient, there being no obstruction whatever for preventing the functioning of the springs closing the movable jaw.

Another important object of the present invention resides in the provision of a trap which is very easily triggered under the slightest pressure exerted on the triggering plate.

The foregoing and other important objects of the present invention will become more apparent during the following disclosure and by referring to the drawings, in which.

Figure 1:
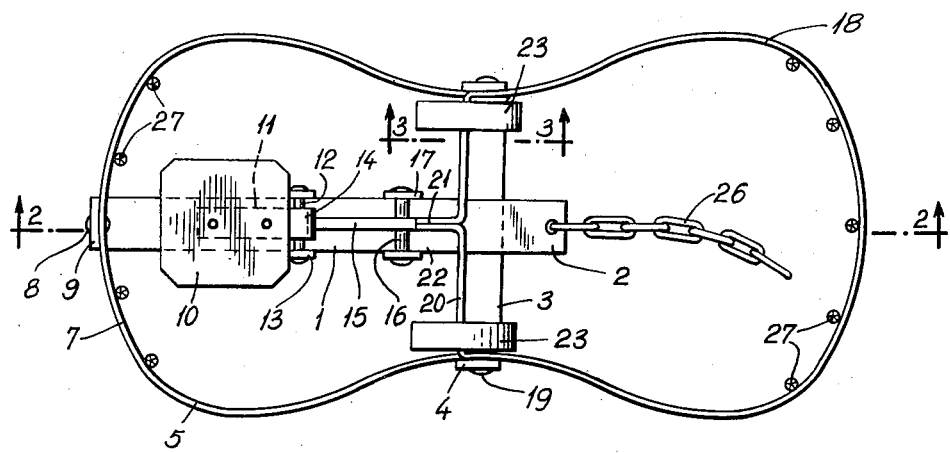
FIGURE 1 is a top plan view of the trap in opened position.

Referring now more particularly to the drawings in which like reference characters indicate like elements throughout, the frame of the trap in accordance with the invention comprises a longitudinal metal flat bar 1 disposed along the longitudinal axis of the trap and a transverse flat bar 3 secured to bar 1 near the rear end 2 thereof and forming a T-shape with bar 1. The ends of transverse bar 3 are bent upwardly in order to form legs 4. A stationary jaw 5 consisting of a flat bar or strip bent into a U when seen in top plan view, has its ends secured by rivets 6 to the lower portion of legs 4 while the middle of the bight part 7 of the stationary jaw 5 is secured by rivets 8 to the upstanding leg 9 formed by the bent front end of the longitudinal bar 1. A triggering plate 10 is secured to the horizontal leg of an L-shaped triggering lever 11, the vertical leg of which is pivotally mounted on a transverse horizontally disposed rod 12 secured to a U-shaped bracket 13 itself fixed to bar 1 at approximately the middle of the latter. The lever 11 has a rearwardly protruding lip 14 formed at the junction of the two legs of said lever 11 and which removably engages and overlaps the forward end of an intermediate lever 15 which is pivoted near its rear end on a rod 16 itself secured to a U-shaped bracket 17 fixed to longitudinal bar 1 between bracket 13 and transverse bar 3.

A movable jaw 18 of a U-shape similar to that of stationary jaw 5 is rotatably mounted at its two ends on the upper ends of legs 4 of transverse bar 3 by means of rivets 19 which are secured to the ends of the movable jaw 18 and rotatably engages holes made in the legs 4. Forwardly of the pivots 19, the sides of the movable jaw 18 are bent and extended by inwardly directed extensions which are directed towards each other generally parallel to transverse bar 3 and the ends 21 of which are bent forwardly parallel to bar 1 and over the same and are in contact with each other and overlap the rear end of intermediate lever 15. The ends 21 may be secured together if desired.

Figure 3:
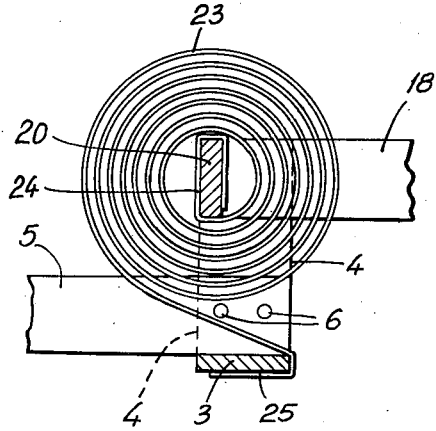
FIGURE 3 is a partial section taken along line 3—3 of FIGURE 1.

On each side of the trap, there is provided a flat spiral spring 23, the inner end 24 of which is bent around the movable jaw extension 20 to be anchored thereto and the outer end 25 of which is bent and hooked to the transverse bar 3, as shown in FIGURE 3. The spiral springs 23 are stressed in such a manner as to exert on the movable jaw 18 a force tending to pivot said jaw 18 about pivots 19 into a closing position registering with the stationary jaw 5.

The rear end 2 of longitudinal bar 1 which protrudes from transverse bar 3 is attached to the end of a chain 26 which serves to anchor the trap to a tree, peg or the like.

For big game, such as bear, the two jaws are provided with spikes 27 secured to the bight portions of said jaws. For medium game, such as beaver, the spikes 27 are only secured to the stationary jaw 5 while for small game, such as muskrat, the jaws do not have any spikes.

The trap in accordance with the invention operates as follows: The movable jaw 18 is forced open into a position generally parallel with the stationary jaw 5 against the action of spiral springs 23, lever 15 having previously been raised at its front end in order to clear the ends 21 of movable jaw 18. The front portion of lever 15 is then lowered such that its rear end will engage under the ends 21 of jaw 18 and the triggering plate 10 is then lifted in order that its lip 14 will engage the front end of lever 15. The trap is thus cocked and is ready to operate.

Figure 2:
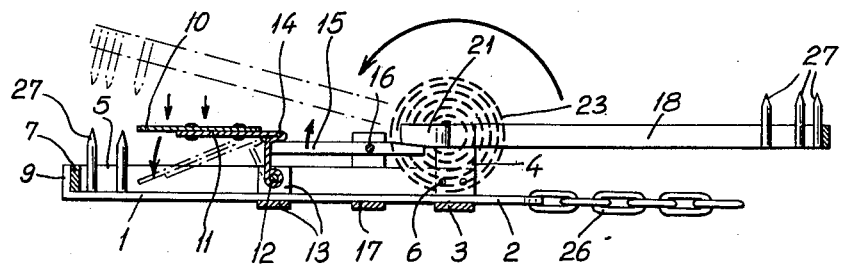
FIGURE 2 is a longitudinal section taken along line 2—2 of FIGURE 1.

Under the slightest downward pressure exerted on triggering plate 10 the latter will pivot downwardly as indicated by the dotted lines in FIGURE 2, thereby releasing the lever 15 which pivots upwardly and in turn releases the ends 21 of the movable jaw 18, the latter being released, is forceably closed under action of springs 23.

While a preferred embodiment in accordance with the present invention has been illustrated and described, it is understood that various modifications may be resorted to without departing from the spirit and scope of the appended claims.

What I claim is:

1. An animal trap comprising a frame adapted to be disposed substantially horizontally, a stationary U-shaped jaw secured to said frame, a movable U-shaped jaw pivotally mounted on said frame for pivotal movement between an opened position generally parallel with said first jaw and extending rearwardly thereof and a closed position abutting against said first jaw, a triggering L-shaped lever having a vertical leg pivotally mounted on said frame at its lower end inside said first jaw and forwardly of the pivotal connection of said movable jaw to said frame, said lever having a horizontal leg extending forwardly of said vertical leg and a lip extending rearwardly from the upper end of said vertical leg, an intermediate lever pivoted intermediate its front and back ends on said frame, and having its front end releasably engageable under said lip of said triggering lever and its back end releasably engaged under a part of said movable jaw forwardly of the pivotal connection of said movable jaw to said frame, and flat spiral springs on each side of said movable jaw and one end of each of which is secured to said movable jaw and the other end of each of which is secured to said frame.

2. An animal trap as claimed in claim 1, wherein said frame consists of two flat bars secured at right angles to each other, one bar extending longitudinally of said trap and having its front end secured to the bight portion of said first jaw, the other of said bars being transversely disposed and provided at its ends with upwardly extending legs supporting the pivotal connections of said movable jaw to said frame, the outer ends of the sides of said stationary jaw being secured to the legs of said transverse bar near the lower ends of said legs while the pivot connection of said movable jaw to said legs are disposed at the upper ends of said legs, said movable jaw being provided with inwardly directed extensions disposed forwardly of the pivotal connections of said movable jaw to said frame, and generally parallel to said transverse bar of said frame, said spiral springs having one end attached to said extensions and the other end attached to said transverse bar adjacent said legs.

3. An animal trap as claimed in claim 2, wherein said extensions are bent forwardly at their ends to form central portions abutting each other and which define said part of said movable jaw overlapping the back end of said intermediate lever.

References Cited in the file of this patent

UNITED STATES PATENTS

| | | |
|---|---|---|
| 929,493 | Rich | July 27, 1909 |
| 968,990 | Schuyler | Aug. 30, 1910 |
| 1,089,975 | Shaw | Mar. 10, 1914 |
| 1,362,168 | McQuaid | Dec. 14, 1920 |
| 1,557,847 | Kerr | Oct. 20, 1925 |